US009361787B2

(12) United States Patent
Ohashi

(10) Patent No.: US 9,361,787 B2
(45) Date of Patent: *Jun. 7, 2016

(54) INFORMATION PROCESSING APPARATUS, INFORMATION PROCESSING METHOD, PROGRAM CONTROL TARGET DEVICE, AND INFORMATION PROCESSING SYSTEM

(71) Applicant: Sony Corporation, Tokyo (JP)

(72) Inventor: Yoshinori Ohashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/328,129

(22) Filed: Jul. 10, 2014

(65) Prior Publication Data

US 2014/0320273 A1 Oct. 30, 2014

Related U.S. Application Data

(63) Continuation of application No. 12/930,012, filed on Dec. 23, 2010, now Pat. No. 8,797,151.

(30) Foreign Application Priority Data

Jan. 4, 2010 (JP) ............................... P2010-000135

(51) Int. Cl.

| | |
|---|---|
| ***G08C 19/16*** | (2006.01) |
| ***G06F 3/02*** | (2006.01) |
| ***G06G 5/00*** | (2006.01) |
| ***G05B 19/02*** | (2006.01) |
| ***H04B 10/00*** | (2013.01) |
| ***G08C 17/02*** | (2006.01) |

(52) U.S. Cl.

CPC ............ *G08C 17/02* (2013.01); *G08C 2201/21* (2013.01); *G08C 2201/92* (2013.01)

(58) Field of Classification Search

CPC ................................. G08C 19/16; G06F 3/02

USPC ................ 340/12.5, 12.22, 12.25, 4.3, 13.24; 345/169, 173, 156; 725/48, 37, 44, 49, 725/88; 709/245

See application file for complete search history.

(56) References Cited

U.S. PATENT DOCUMENTS 6,127,941 A * 10/2000 Van Ryzin .................. 340/4.37
6,269,395 B1 * 7/2001 Blatherwick ......... G06F 9/4443 707/E17.005

(Continued)

FOREIGN PATENT DOCUMENTS

JP 10-322782 A 12/1998

*Primary Examiner* — Nam V Nguyen
(74) *Attorney, Agent, or Firm* — Chip Law Group

(57) ABSTRACT

There is provided a remote commander including an input section which accepts input of operation information from a user, a communication section which communicates with a control target device via a radio signal, a service information-acquisition section which acquires, from the control target device via the communication section, service identification information for identifying each of one or a plurality of services which the control target device is capable of providing the remote commander with, and a notification section which selects any of one or a plurality of pieces of the service identification information acquired by the service information-acquisition section based on the operation information, the input of which is accepted by the input section, and which notifies the control target device of the selected service identification information via the communication section.

6 Claims, 13 Drawing Sheets

(56) References Cited

U.S. PATENT DOCUMENTS

| | | | |
|---|---|---|---|
| 7,525,473 | B2 | 4/2009 | Chu et al. |
| 7,535,465 | B2 | 5/2009 | Morse et al. |
| 7,681,194 | B2 | 3/2010 | Van Ee et al. |
| 8,054,294 | B2 | 11/2011 | Sakai et al. |
| 8,106,742 | B2 | 1/2012 | Marshall et al. |
| 8,166,504 | B2 | 4/2012 | Kang et al. |
| 8,176,514 | B2 | 5/2012 | Yi |
| 8,234,672 | B2 | 7/2012 | Morse et al. |
| 8,284,094 | B2 * | 10/2012 | Hamai et al. .................. 341/176 |
| 8,305,422 | B2 * | 11/2012 | Toya et al. ................. 348/14.08 |
| 8,627,364 | B2 | 1/2014 | Song et al. |
| 8,677,417 | B2 * | 3/2014 | Calvert ........................... 725/49 |
| 8,797,151 | B2 * | 8/2014 | Ohashi ......................... 340/12.5 |
| 9,071,272 | B2 * | 6/2015 | Black .................... G06F 3/0219 |
| 9,137,494 | B2 * | 9/2015 | McCarthy ............ G06Q 20/123 |
| 2004/0148632 | A1 | 7/2004 | Park et al. |
| 2005/0204060 | A1 * | 9/2005 | Maekawa .......... H04L 29/12528 709/245 |
| 2009/0059090 | A1 | 3/2009 | Fan et al. |
| 2009/0150947 | A1 | 6/2009 | Soderstrom |
| 2009/0298535 | A1 | 12/2009 | Klein et al. |
| 2010/0208145 | A1 | 8/2010 | VanDuyn et al. |
| 2011/0109444 | A1 | 5/2011 | Edwards et al. |
| 2011/0157004 | A1 * | 6/2011 | Ohashi ............... H04N 5/44582 345/156 |

* cited by examiner

FIG.6

```
<categoryList>
        <caregory name="Video">
        <caregory name="Music">
        <caregory name="Photo">
        <caregory name="ServiceXXX">
        <caregory name="ServiceA">
</categoryList>
```

INFORMATION PROCESSING APPARATUS, INFORMATION PROCESSING METHOD, PROGRAM CONTROL TARGET DEVICE, AND INFORMATION PROCESSING SYSTEM

This application is a continuation of U.S. patent application Ser. No. 12/930,012, filed on Dec. 23, 2010, now U.S. Pat. No. 8,797,151, which claims priority from Japanese Patent Application No. JP 2010-000135 filed in the Japanese Patent Office on Jan. 4, 2010, the entire contents of which are incorporated herein by reference.

BACKGROUND OF THE INVENTION

1. Field of the Invention

The present invention relates to an information processing apparatus, an information processing method, a program, a control target device, and an information processing system.

2. Description of the Related Art

In recent years, control target devices including display devices such as TVs and recording devices such as video recorders have been in widespread use mainly in households. In order to cause such a control target device to execute desired processing, a user can use an information processing apparatus which controls the control target device by transmitting a command using a radio signal to the control target device and causing the control target device to execute the command, for example. The information processing apparatus is referred to as remote control or remote commander, and, as the types thereof, there are exemplified an RF (Radio Frequency) remote control and an infrared remote control.

Meanwhile, since the kinds of the control target devices become diverse, it is assumed that one information processing apparatus, which transmits a command to a control target device, is provided for each of the control target devices. However, when an information processing apparatus is provided for each of the control target devices, the number of the information processing apparatuses which the user has to manage increases each time a new control target device is installed, and hence, the management of the information processing apparatuses by the user becomes complicated. Consequently, there have been carried out many attempts for controlling multiple control target devices by one information processing apparatus (for example, refer to JP-A-10-322782). The information processing apparatus having a function of controlling multiple control target devices is also referred to as universal remote control, and, by using the universal remote control, the user can reduce the effort of managing the information processing apparatuses.

SUMMARY OF THE INVENTION

However, in the technology described above, there was an issue that it was difficult for a user to grasp a service available in a control target device. That is, there was an issue that it was difficult for an information processing apparatus to grasp a service which the control target device is capable of providing. Therefore, there was an issue that it was difficult for the user to transmit an appropriate command to the control target device via the information processing apparatus.

In light of the foregoing, it is desirable to provide a novel and improved technology which makes it possible to grasp, per each control target device, a service which a control target device is capable of providing an information processing apparatus with. Further, for example, it is desirable to make the information processing apparatus adaptable to: a service provided by a control target device which is unknown to the information processing apparatus; content in an unknown format which is provided by a control target device; and content provided by an unknown web service which is provided by a web server via the control target device. Further, for example, it is desirable to provide a technology capable of directly displaying a list of pieces of content, a content list as results of search by a keyword, and the like, by an information processing apparatus using a mobile device having a liquid crystal screen as a remote control, and reproducing the content selected by a user.

According to an embodiment of the present invention, there is provided an information processing apparatus which includes an input section which accepts input of operation information from a user, a communication section which communicates with a control target device via a radio signal, a service information-acquisition section which acquires, from the control target device via the communication section, service identification information for identifying each of one or a plurality of services which the control target device is capable of providing the information processing apparatus with, and a notification section which selects any of one or a plurality of pieces of the service identification information acquired by the service information-acquisition section based on the operation information, the input of which is accepted by the input section, and which notifies the control target device of the selected service identification information via the communication section.

The notification section may include a content information-acquisition section which acquires, from a content providing apparatus through the control target device via the communication section, content identification information for identifying each of one or a plurality of pieces of content used for the service identified by the service identification information which the control target device is notified of, and may include an instruction section which selects any of one or a plurality of pieces of the content identification information acquired by the content information-acquisition section based on the operation information, the input of which is accepted by the input section, and which notifies the control target device of the selected content identification information via the communication section.

The notification section may include a content information-acquisition section which acquires, from a content providing apparatus via the communication section, content identification information for identifying each of one or a plurality of pieces of content used for the service identified by the service identification information which the control target device is notified of, and may include an instruction section which selects any of one or a plurality of pieces of the content identification information acquired by the content information-acquisition section based on the operation information, the input of which is accepted by the input section, and which notifies the control target device of the selected content identification information via the communication section.

According to another embodiment of the present invention, there is provided an information processing apparatus which includes an input section which accepts input of operation information from a user, a communication section which communicates with a control target device via a radio signal, a transmission/reception section which communicates with a server, a service information-acquisition section which acquires model information for identifying service identification information for identifying each of one or a plurality of services which the control target device is capable of providing the information processing apparatus with, which transmits the acquired model information to the server via the transmission/reception section, and which acquires the service identification information identified by the model information from the server via the transmission/reception section, and a notification section which selects any of one or a plurality of pieces of the service identification information acquired by the service information-acquisition section based on the operation information, the input of which is accepted by the input section, and which notifies the control target device of the selected service identification information via the communication section.

The service information-acquisition section may acquire the model information from the control target device via the communication section.

The service information-acquisition section may acquire the model information from the operation information, the input of which is accepted by the input section.

According to the embodiments of the present invention described above, it is possible to grasp, per each control target device, a service which a control target device is capable of providing an information processing apparatus with.

BRIEF DESCRIPTION OF THE DRAWINGS

FIG. 6 is a diagram showing an example of an available service list transmitted from the control target device according to the embodiment;

DETAILED DESCRIPTION OF THE EMBODIMENTS

Figure 1:
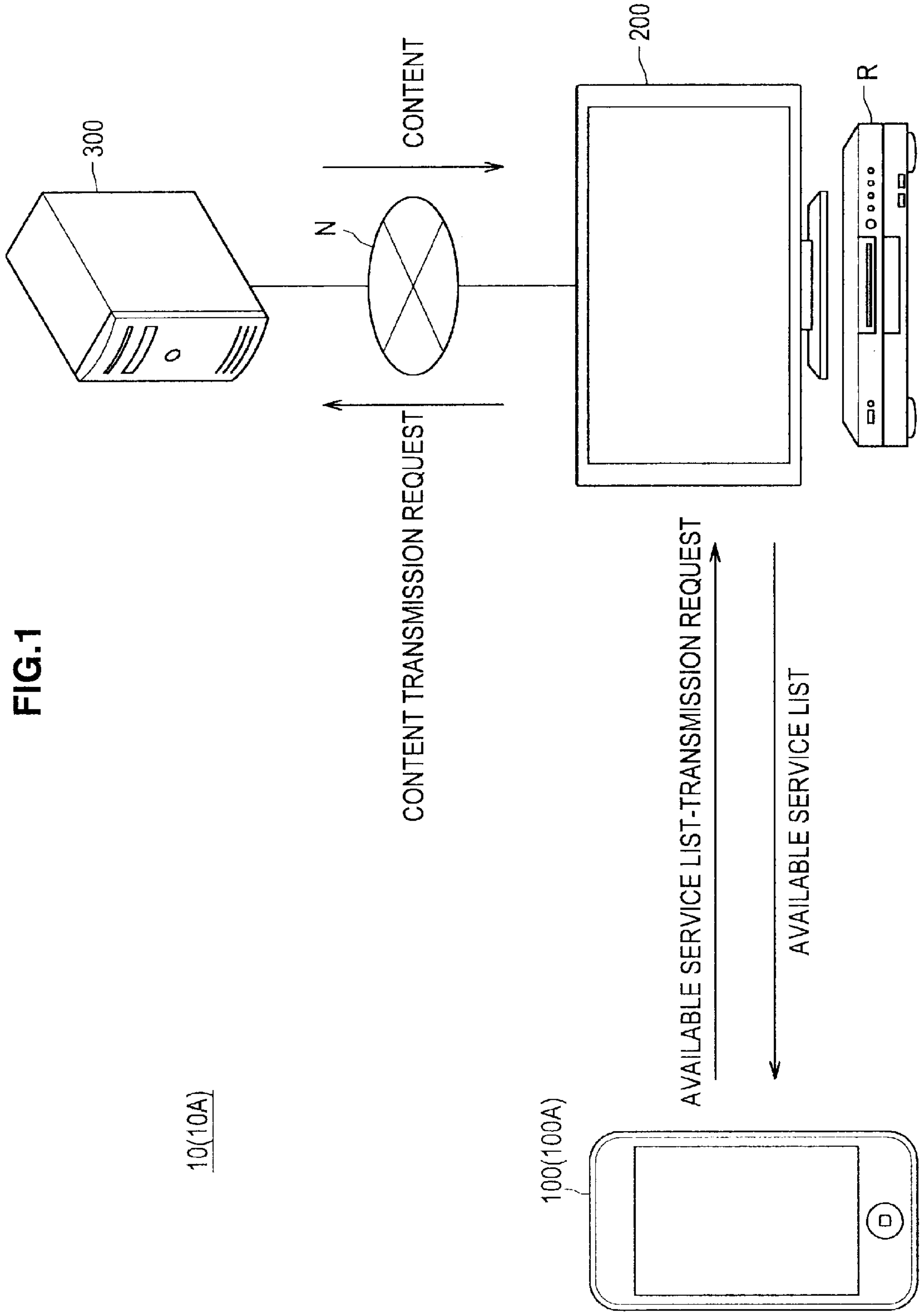
FIG. 1 is a diagram showing a configuration of an information processing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. In the case of distinguishing structural elements of one embodiment from structural elements of another embodiment, the structural elements are denoted with different reference numerals (for example, XA, XB, . . . ), and in the case of not distinguishing structural elements of one embodiment from structural elements of another embodiment, the structural elements are denoted with the same reference numerals (for example, X).

Note that the description will be given in the following order.

1. First Embodiment
1-1. Configuration of information processing system
1-2. Example of available service list-screen and example of content list-screen
1-3. Functional configuration of remote commander
1-4. Functional configuration of control target device
1-5. Functional configuration of content providing apparatus
1-6. Example of available service list
1-7. Flow of processing up to acquisition of available service list
1-8. Flow of processing after acquisition of available service list (part 1)
1-9. Flow of processing after acquisition of available service list (part 2)
2. Second Embodiment
2-1. Configuration of information processing system
2-2. Functional configuration of remote commander
2-3. Functional configuration of server
2-4. Processing executed by information processing system
3. Modified Example
4. Summary

1. First Embodiment

First, a first embodiment of the present invention will be described. In the first embodiment of the present invention, an information processing apparatus acquires an available service list from a control target device.

1-1. Configuration of Information Processing System

FIG. 1 is a diagram showing a configuration of an information processing system according to the first embodiment of the present invention. With reference to FIG. 1, the configuration of the information processing system according to the embodiment will be described.

As shown in FIG. 1, an information processing system 10A according to the first embodiment of the present invention includes a remote commander 100A as an example of the information processing apparatus, a control target device 200, and a content providing apparatus 300. The content providing apparatus 300 and the control target device 200 can communicate with each other via a network N, for example. The remote commander 100A and the control target device 200 can communicate with each other via a radio signal, for example.

When operation information for selecting the control target device 200 is input to the remote commander 100A from a user, the remote commander 100A transmits an available service list-transmission request to the control target device 200. The available service list is a list of service identification information for identifying a service which the control target device 200 is capable of providing the remote commander 100A with. The kinds of services are not particularly limited. For example, in the case where the control target device 200 provides a service of reproducing content, a service of transmitting content to the remote commander 100A, and the like, it is assumed that the kinds of services are the kinds of content to be reproduced or transmitted.

Figure 2:
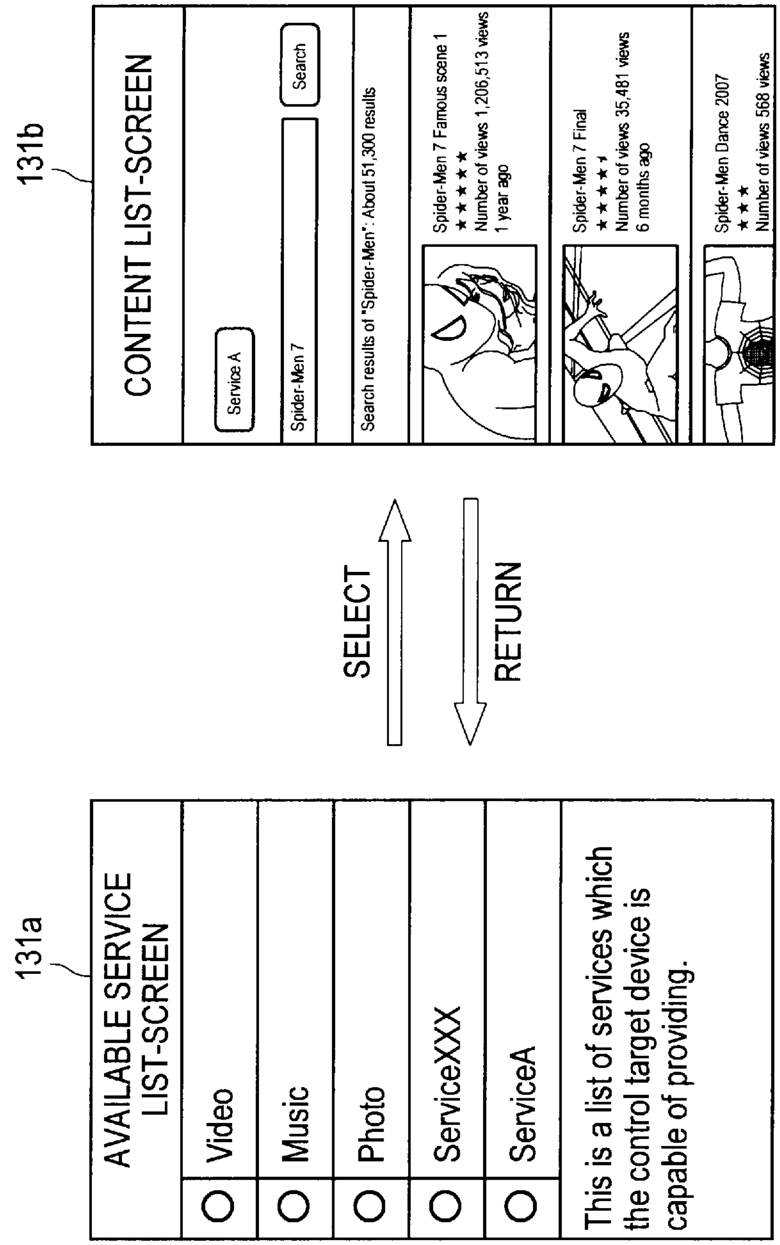
FIG. 2 is a diagram showing an example of an available service list-screen and an example of a content list-screen each displayed on a remote commander according to the embodiment.

In the example shown in FIG. 2, "Video" represents service identification information for identifying a service of reproducing moving image content. In the same manner, "Music" represents service identification information for identifying a service of reproducing music content, "Photo" represents service identification information for identifying a service of reproducing still image content, "ServiceXXX" represents service identification information for identifying a service of reproducing video/audio content via the Internet, and "ServiceA" represents service identification information for identifying a service of reproducing web content by a predetermined web page. When receiving the available service list-transmission request from the remote commander 100A, the control target device 200 sends back, as the response thereto, an available service list to the remote commander 100A.

The remote commander 100A generates and displays a screen for allowing the user to select service identification information in accordance with the available service list received from the control target device 200. When the user inputs operation information to the remote commander 100A while viewing the screen, the remote commander 100A selects service identification information based on the operation information, the input of which is accepted, and transmits the service identification information to the control target device 200 or the content providing apparatus 300. The control target device 200 or the content providing apparatus 300 receives the service identification information from the remote commander 100A, and notifies the remote commander 100A of a list of content identification information for identifying content to be used for the service identified by the received service identification information. The content identification information for identifying the content corresponds to a content list.

The remote commander 100A displays the content list received from the control target device 200 or the content providing apparatus 300. When the user inputs operation information to the remote commander 100A while viewing the screen, the remote commander 100A selects content identification information based on the operation information, the input of which is accepted, and transmits the selected content identification information to the control target device 200. The control target device 200 transmits a content transmission request including the received content identification information to the content providing apparatus 300, and acquires, as the response thereto, content from the content providing apparatus 300. The control target device 200 can also reproduce the acquired content and provide the remote commander 100A with the acquired content.

The hardware configuration of the remote commander 100A is not particularly limited, and the remote commander 100A may be, for example, mobile information terminals such as a PC (Personal Computer), a mobile phone, and a PDA (Personal Digital Assistant), game machines, or various home information appliances. In the present embodiment, there will be described the case where the remote commander 100A is a mobile information terminal which includes a touch panel input device and a display device having a relatively small display area.

The hardware configuration of the control target device 200 is also not particularly limited, and may be any as long as the control target device 200 has a function of executing processing in accordance with the command transmitted by the remote commander 100A. In the present embodiment, although the case where the control target device 200 is a display device such as a TV will be described, the control target device 200 may also be a recording device R, for example.

The hardware configuration of the content providing apparatus 300 is also not particularly limited, and may be any as long as the content providing apparatus 300 has a function of providing the control target device 200 with content. In the present embodiment, the case where the content providing apparatus 300 is a device for providing the control target device 200 with content via network N will be described.

In the present embodiment, there will be described in detail a technique of grasping, per each control target device 200, a service which the control target device 200 is capable of providing the remote commander 100A with.

1-2. Example of Available Service List-Screen and Example of Content List-Screen FIG. 2 is a diagram showing an example of an available service list-screen and an example of a content list-screen each displayed on a remote commander according to the first embodiment of the present invention. With reference to FIG. 2, the example of an available service list-screen and the example of a content list-screen each displayed on the remote commander according to the embodiment will be described.

As shown in FIG. 2, the remote commander 100A can display an available service list received from the control target device 200 as an available service list-screen 131*a*, for example. As available services, there are displayed "Video", "Music", "Photo", "ServiceXXX", "ServiceA", and the like.

Further, for example, it is assumed that the remote commander 100A accepts the input of information for selecting "ServiceA" from the user. Then, the remote commander 100A acquires a list (content list) of content identification information for identifying content used by "ServiceA" from the control target device 200 or the content providing apparatus 300. The remote commander 100A can also acquire a content list in accordance with a search condition (keywords or genre of content).

The remote commander 100A can display the content list received from the control target device 200 or the content providing apparatus 300 as a content list-screen 131*b*. In the content list-screen 131*b*, there is displayed, as a list, content in which the keyword "Spider-Men 7" is contained in content detailed information (meta-information) from among the pieces of content used by "ServiceA". The remote commander 100A may switch the display screen back to the available service list-screen 131*a* from the content list-screen 131*b* based on the operation information input from the user, for example.

There are considered various techniques for the remote commander 100A to acquire a keyword and a genre. For example, when the remote commander 100A acquires the content detailed information from the control target device 200 and displays the content detailed information, the user finds the keyword or the genre which the user wants to use for the search from the content detailed information, and inputs operation information for designating the found keyword or genre to the remote commander 100A. The remote commander 100A can specify the keyword or genre, and can use the specified keyword or genre as the above-mentioned search condition.

Further, for example, the remote commander 100A may use the information input by the user as the above-mentioned search condition. Further, for example, the remote commander 100A may acquire an ID for identifying content from the control target device 200, and may acquire the content detailed information from a predetermined server based on the acquired ID. As a technique of specifying the search condition from the content detailed information, there can be adopt the same technique as the example described above, for example.

Further, for example, the remote commander 100A may receive content analysis results obtained by analyzing the content by the control target device 200, and may acquire the content detailed information from a predetermined server based on the received content analysis results. Alternatively, the remote commander 100A may receive the content from the control target device 200, may acquire content analysis results by analyzing the received content, and may acquire the content detailed information from a predetermined server based on the acquired content analysis information.

The content detailed information may be any information as long as it is information related to the content, and may be a creator, a title, and a cast of the content, for example. Further, in the case where the content is music, the content detailed information may be the lyrics of the music.

1-3. Functional Configuration of Remote Commander

Figure 3:
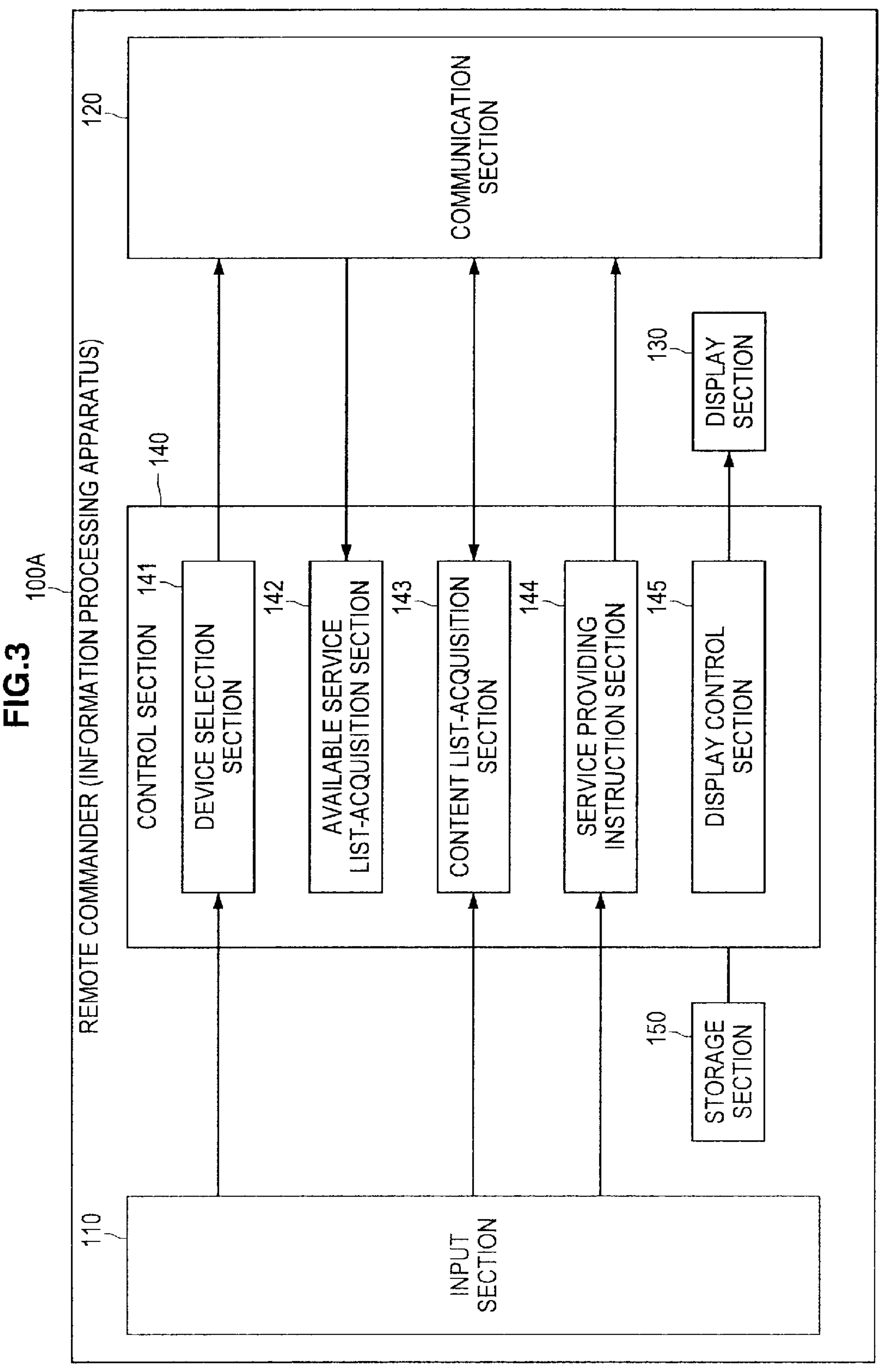
FIG. 3 is a diagram showing a functional configuration of the remote commander according to the embodiment.

FIG. 3 is a diagram showing a functional configuration of the remote commander according to the first embodiment of the present invention. With reference to FIG. 3, the functional configuration of the remote commander according to the embodiment will be described.

As shown in FIG. 3, the remote commander 100A includes an input section 110, a communication section 120, a display section 130, a control section 140, and a storage section 150.

The input section 110 has a function of accepting input of operation information from a user. The input section 110 includes an input device, for example. As the input section 110, there can be used a touch panel, a keyboard, a mouse, and a button, for example. However, in the present embodiment, there will be particularly described the case where a touch panel is used as the input section 110.

The communication section 120 has a function of communicating with the control target device 200 via a radio signal. The communication section 120 includes a communication device, for example. As a communication mode used for the communication with the control target device 200 via a radio signal, there can be used a communication mode using infrared rays, a communication mode using radio waves, a communication mode via the Internet, and the like. That is, the communication mode used for the communication with the control target device 200 via a radio signal is not particularly limited.

The display section 130 has a function of displaying information output from the control section 140. The display section 130 includes a display device, for example. As the display section 130, there can be used a CRT (Cathode Ray Tube), an LCD (Liquid Crystal Display), a PDP (Plasma Display Panel), and an ELD (Electro-Luminescence Display), for example.

The control section 140 has a function of controlling operation of the remote commander 100A. The control section 140 includes, for example, a CPU (Central Processing Unit) and a RAM (Random Access Memory). The function of the control section 140 is realized by developing a program stored in the storage section 150 in the RAM by the CPU, and executing the program developed in the RAM by the CPU. The control section 140 includes a device selection section 141, an available service list-acquisition section 142, a content list-acquisition section 143, a service providing instruction section 144, and a display control section 145.

The device selection section 141 has a function of acquiring device selection information via the input section 110 from the user. When acquiring the device selection information via the input section 110 from the user, the device selection section 141 transmits an available service list-transmission request to the control target device 200 via the communication section 120 using a radio signal. Note that the device selection information is information which is input in the case of detecting a control target device 200 from which the user wants to acquire an available service list.

The available service list-acquisition section 142 has a function of acquiring, from the control target device 200 via the communication section 120, service identification information for identifying each of one or multiple services which the control target device 200 is capable of providing the remote commander 100A with. Although the kinds of services are not particularly limited as described above, there are assumed a service of reproducing content, a service of transmitting content to the remote commander 100A, and the like. Examples of the service identification information will be described later with reference to FIG. 6. The available service list-acquisition section 142 functions as an example of a service information-acquisition section.

The control section 140 includes a notification section which selects any of one or multiple pieces of service identification information acquired by the available service list-acquisition section 142 based on the operation information, the input of which is accepted by the input section 110, and which notifies the control target device 200 of the selected service identification information via the communication section 120. The control target device 200 can provide a service identified by the service identification information which the control target device 200 is notified of by the notification section. The kinds of services are not particularly limited as described above.

According to such a configuration, it becomes possible for the remote commander 100A grasp, per each control target device 200, a service which the control target device 200 is capable of providing the remote commander 100A with. The notification section includes, for example, the content list-acquisition section 143 and the service providing instruction section 144.

The content list-acquisition section 143 has a function of acquiring, from the content providing apparatus 300 through the control target device 200 via the communication section 120, content identification information for identifying each of one or multiple pieces of content used for the service identified by the service identification information which the control target device 200 is notified of. Alternatively, the content list-acquisition section 143 may directly acquire, from the content providing apparatus 300 via the communication section 120, content identification information for identifying each of one or multiple pieces of content used for the service identified by the service identification information which the control target device 200 is notified of. In order that the content list-acquisition section 143 directly acquire the content identification information from the content providing apparatus 300, the content list-acquisition section 143 may have the same function as, for example, a function that a content list relay section of the control target device 200 has, which will be described later.

The content list-acquisition section 143 may acquire a content list in accordance with a search condition such as a keyword or a genre as described above. The content list-acquisition section 143 functions as an example of a content information-acquisition section.

The service providing instruction section 144 has functions of selecting any of one or multiple pieces of content identification information acquired by the content list-acquisition section 143 based on the operation information, the input of which is accepted by the input section 110, and notifying the control target device 200 of the selected content identification information via the communication section 120. The service providing instruction section 144 functions as an example of an instruction section.

According to such a configuration, the remote commander 100A can select content used for a service provided by the control target device 200 in accordance with the instruction of the user.

The display control section 145 has a function of causing the display section 130 to display the available service list acquired by the available service list-acquisition section 142. A display example of the available service list will be described later with reference to FIG. 2. The display control section 145 has a function of causing the display section 130 to display the content list acquired by the content list-acquisition section 143. In addition thereto, the display control section 145 has a function of switching screens to be displayed by the display section 130 based on the operation information input by the input section 110.

The storage section 150 has a function of storing data and programs used by the control section 140. The storage section 150 includes an HDD (Hard Disk Drive) and a semiconductor memory, for example.

1-4. Functional Configuration of Control Target Device

Figure 4:
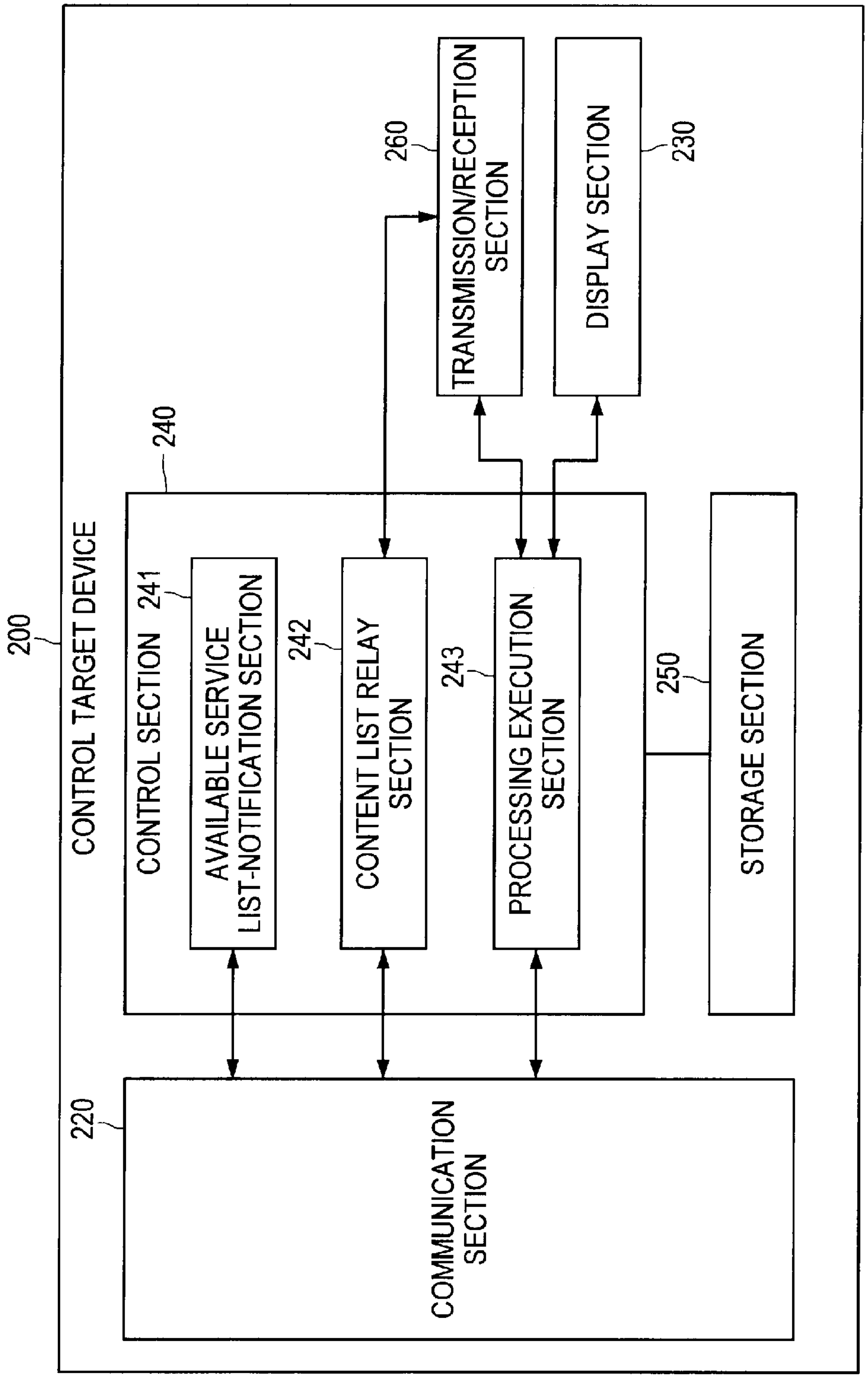
FIG. 4 is a diagram showing a functional configuration of a control target device according to the embodiment.

FIG. 4 is a diagram showing a functional configuration of a control target device according to the first embodiment of the present invention. With reference to FIG. 4, the functional configuration of the control target device according to the embodiment will be described.

As shown in FIG. 4, the control target device 200 includes a communication section 220, a display section 230, a control section 240, a storage section 250, and a transmission/reception section 260.

The communication section 220 has a function of communicating with the remote commander 100A via a radio signal. The communication section 220 includes a communication device, for example. A communication mode used for the communication with the remote commander 100A via a radio signal is not particularly limited as described above.

The display section 230 has a function of displaying information output from the control section 240. The display section 230 includes a display device, for example. As the display section 230, there can be used a CRT, an LCD, a PDP, and an ELD, for example.

The control section 240 has a function of controlling operation of the control target device 200. The control section 240 includes, for example, a CPU and a RAM. The function of the control section 240 is realized by developing a program stored in the storage section 250 in the RAM by the CPU, and executing the program developed in the RAM by the CPU. The control section 240 includes an available service list-notification section 241, a content list relay section 242, and a processing execution section 243.

The available service list-notification section 241 has a function of notifying, via the communication section 220, the remote commander 100A of the available service list stored in the storage section 250. When receiving an available service list-transmission request from the remote commander 100A, for example, the available service list-notification section 241 notifies the remote commander 100A of the available service list as a response. The available service list-notification section 241 corresponds to an example of a notification section.

The processing execution section 243 has functions of acquiring the service identification information selected by the remote commander 100A from the remote commander 100A via the communication section 220, and executing the processing of providing the service identified by the acquired service identification information. As described above, there are assumed various kinds of services, and hence, the services to be provided by the control target device 200 is not particularly limited.

As described above, for example, in the case where the control target device 200 provides a service of reproducing content, a service of transmitting content to the remote commander 100A, and the like, it is assumed that the kinds of services are the kinds of content to be reproduced or transmitted. For example, the remote commander 100A can cause the storage section 250 to store association information formed by associating the service identification information with information for identifying a storage location of the content used for the service. In this case, the processing execution section 243 can acquire the storage location of the content which is associated with the service identification information selected by the remote commander 100A and which is stored in the storage section 250, and can acquire the content from the acquired storage location, to thereby reproduce the content or transmit the content to the remote commander 100A.

There are assumed various kinds of content storage locations. In the case where the content to be reproduced or transmitted is stored in the storage section 250, an address indicating an area in the storage section 250 where the content is stored can be used as the content storage location, for example. Further, in the case where the content to be reproduced or transmitted is stored in a device (recording device R or the like) which belongs to the same home network to which the control target device 200 belongs, an address of a content storage area in the home network can be used as the content storage location, for example. Further, in the case where the content to be reproduced or transmitted is stored in the content providing apparatus 300 connected to the network N, a URL (Uniform Resource Locator) or the like of web content stored in the content providing apparatus 300 can be used as the content storage location, for example.

The content list relay section 242 has a function of, in the case of acquiring the service identification information via the communication section 220 from the remote commander 100A, transmitting a list of content to be used by the service identified by the service identification information via the communication section 220 to the remote commander 100. The remote commander 100A can cause the storage section 250 to store association information formed by associating the service identification information with a content list storage location. In this case, the content list relay section 242 can acquire the content list from the content list storage location which is associated with the service identification information acquired from the remote commander 100A and which is stored in the storage section 250, and can transmit the content list to the remote commander 100A via the transmission/reception section 260. As the content list storage location, there can be used an address of a content storage area in the home network, a URL of web content, and the like, in the same manner as in the case of the content storage location.

The storage section 250 has a function of storing data and programs used by the control section 240. The storage section 250 includes an HDD and a semiconductor memory, for example. In addition thereto, the storage section 250 has a function of storing an available service list. The available service list, as described above, is a list of service identification information for identifying a service which the control target device 200 is capable of providing the remote commander 100A with. Further, the storage section 250 is capable of storing various pieces of association information as described above.

The transmission/reception section 260 is capable of transmitting/receiving a signal to/from the content providing apparatus 300 by wire or radio. Further, as described above, the transmission/reception section 260 may communicate with the content providing apparatus 300 via the network N.

1-5. Functional Configuration of Content Providing Apparatus

Figure 5:
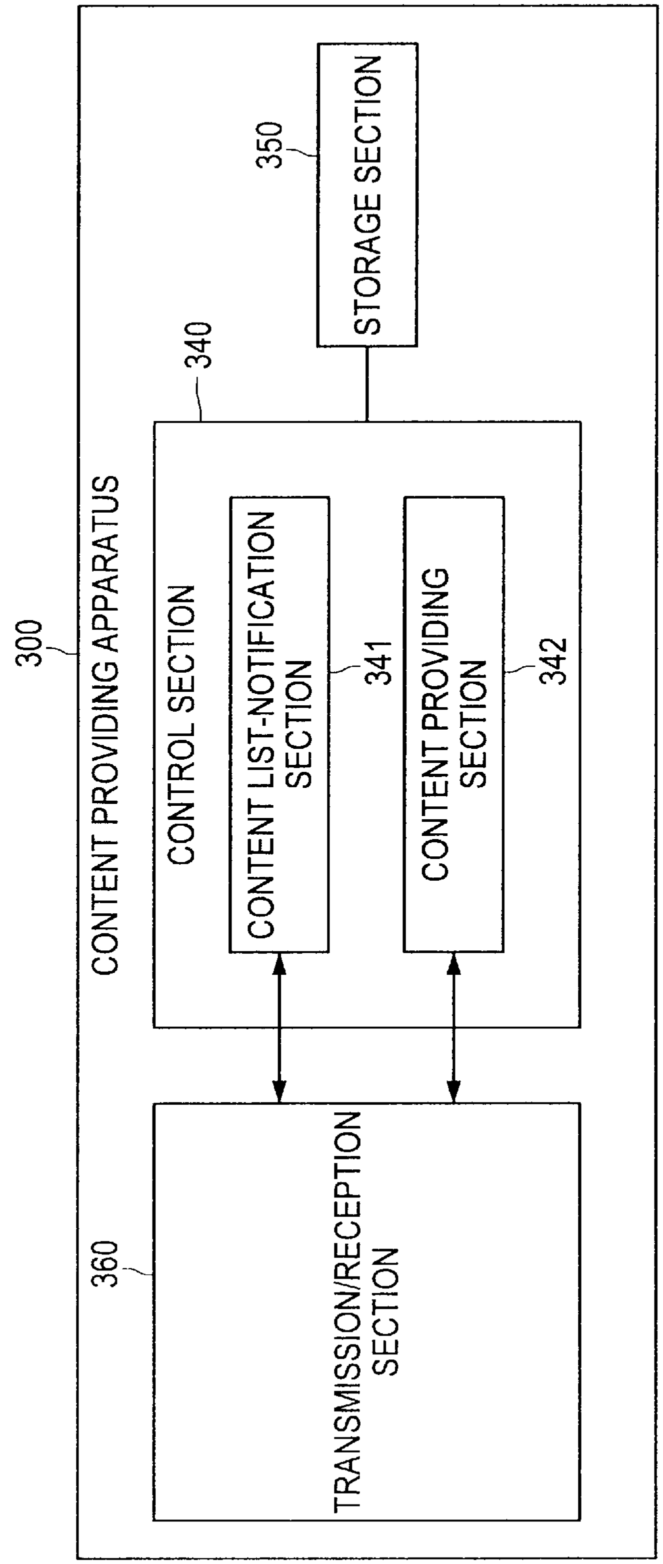
FIG. 5 is a diagram showing a functional configuration of a content providing apparatus according to the embodiment.

FIG. 5 is a diagram showing a functional configuration of a content providing apparatus according to the first embodiment of the present invention. With reference to FIG. 5, the functional configuration of the content providing apparatus according to the embodiment will be described.

As shown in FIG. 5, a content providing apparatus 300 according to the first embodiment of the present invention includes a control section 340, a storage section 350, and a transmission/reception section 360.

The control section 340 has a function of controlling operation of the content providing apparatus 300. The control section 340 includes, for example, a CPU and a RAM. The function of the control section 340 is realized by developing a program stored in the storage section 350 in the RAM by the CPU, and executing the program developed in the RAM by the CPU. The control section 340 includes a content list-notification section 341 and a content providing section 342.

The content list-notification section 341 has a function of notifying the remote commander 100A of a content list via the transmission/reception section 360. As described above, the content list-notification section 341 may indirectly notify the remote commander 100A of the content list through the control target device 200. Further, as described above, the content list-notification section 341 may directly notify the remote commander 100A of the content list.

The content providing section 342 has a function of providing the control target device 200 with content via the transmission/reception section 360. When acquiring a content storage location (URL or the like) via the transmission/reception section 360 from the control target device 200, for example, the content providing section 342 provides the control target device 200 with content present in the acquired content storage location via the transmission/reception section 360.

The storage section 350 has a function of storing data and programs used by the control section 340. The storage section 350 includes an HDD and a semiconductor memory, for example. In addition thereto, the storage section 350 has a function of storing content. Further, the storage section 350 has a function of storing a content list.

The transmission/reception section 360 is capable of transmitting/receiving a signal to/from the control target device 200 by wire or radio. Further, as described above, the transmission/reception section 360 may communicate with the control target device 200 via the network N.

1-6. Example of Available Service List

FIG. 6 is a diagram showing an example of an available service list transmitted from the control target device according to the first embodiment of the present invention. With reference to FIG. 6, an example of the available service list transmitted from the control target device according to the embodiment will be described.

In FIG. 6, there is expressed, by using an XML, an available service list to be transmitted from the control target device 200 to the remote commander 100A. Here, one or multiple category tags are included between categoryList tags, and a name attribute is included in a category tag. The name attribute represents an available service name. The name attribute corresponds to the service identification information mentioned above.

1-7. Flow of Processing up to Acquisition of Available Service List

Figure 7:
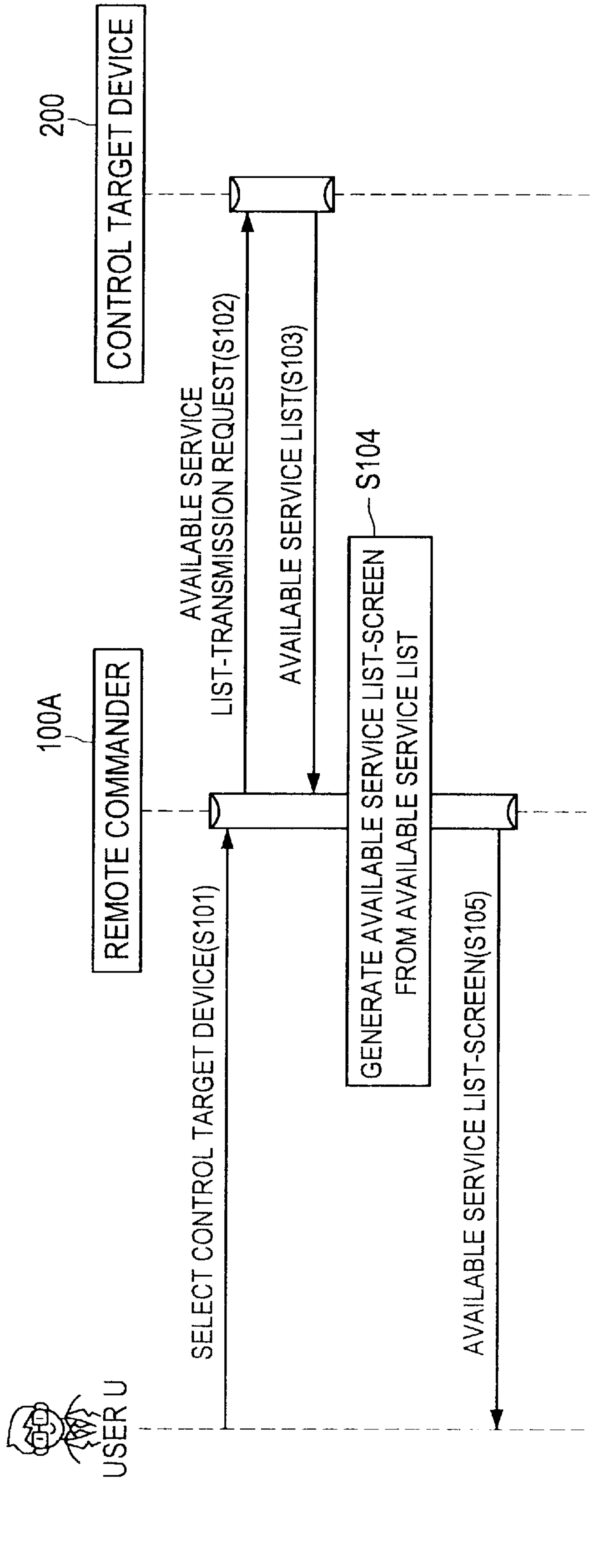
FIG. 7 is a flowchart showing a flow of processing (up to acquisition of an available service list) executed by the information processing system according to the embodiment.

FIG. 7 is a flowchart showing a flow of processing (up to acquisition of an available service list) executed by the information processing system according to the first embodiment of the present invention. With reference to FIG. 7, the processing (up to acquisition of an available service list) executed by the information processing system according to the embodiment will be described.

As shown in FIG. 7, a user U selects a control target device 200 (step S101), and the remote commander 100A transmits an available service list-transmission request to the selected control target device 200 (step S102). The control target device 200 transmits, as a response to the available service list-transmission request, an available service list to the remote commander 100A (step S103).

The remote commander 100A generates an available service list-screen from the available service list received from the control target device 200 (step S104), and displays the generated available service list-screen (step S105).

1-18. Flow of Processing after Acquisition of Available Service List (Part 1)

Figure 8:
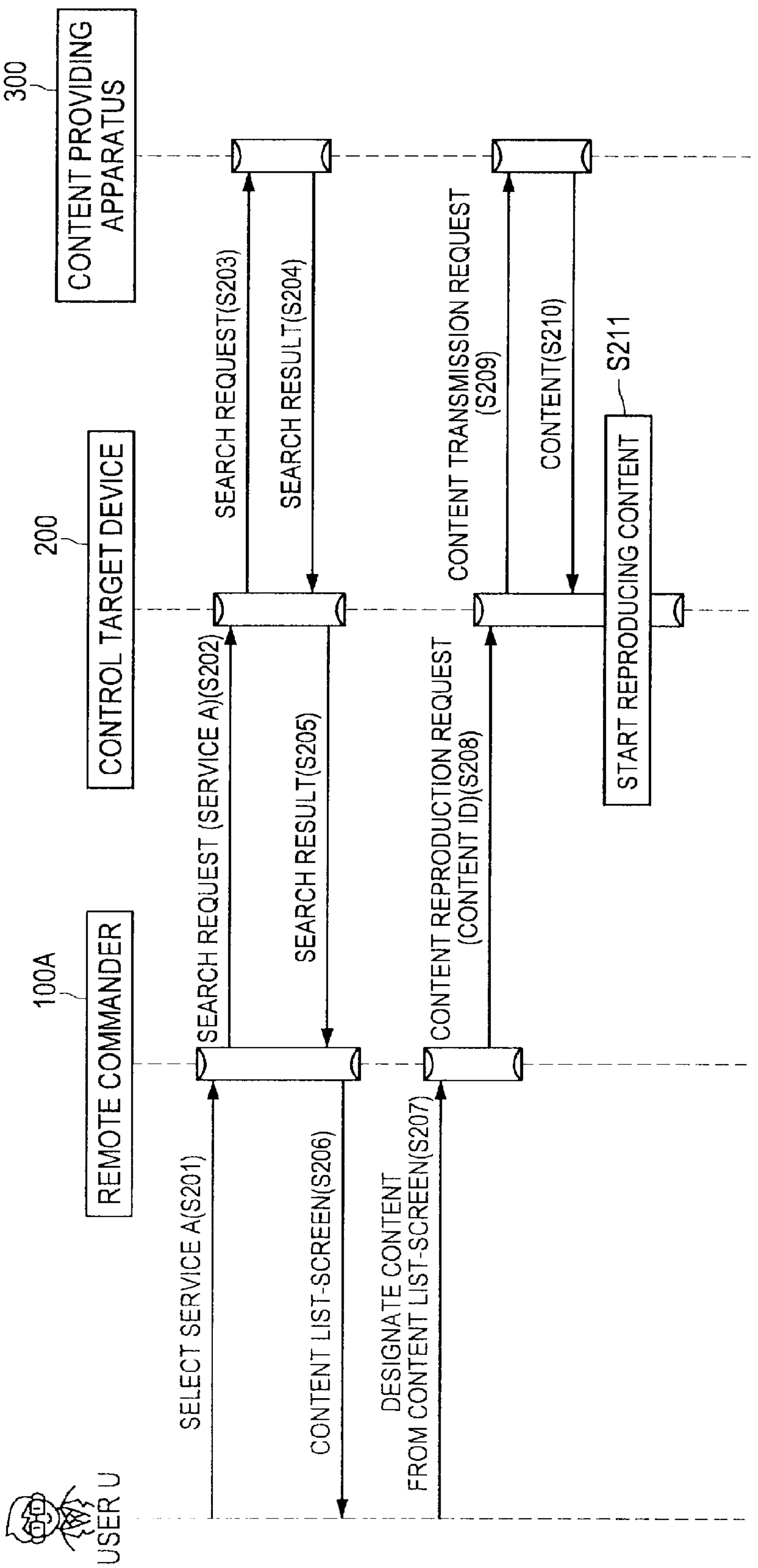
FIG. 8 is a flowchart showing a flow (in the case where the remote commander acquires a content list from the content providing apparatus via the control target device) of processing (after selection of a service) executed by the information processing system according to the embodiment.

FIG. 8 is a flowchart showing a flow (in the case where the remote commander acquires a content list from the content providing apparatus via the control target device) of processing (after selection of a service) executed by the information processing system according to the first embodiment of the present invention. With reference to FIG. 8, the flow (in the case where the remote commander acquires a content list from the content providing apparatus via the control target device) of processing (after selection of a service) executed by the information processing system according to the embodiment will be described.

As shown in FIG. 8, the user U performs remote control operation while viewing the displayed available service list-screen, and selects service identification information. Here, it is assumed that the user U selects “service A” (step S201). The remote commander 100A transmits a search request including the service identification information “service A” selected by the user U to the control target device 200 (step S202).

The control target device 200 acquires a storage location of a list of content to be used by the service identified by the service identification information received from the remote commander 100A, and transmits a search request for acquiring the content list from the storage location to the content providing apparatus 300 (step S203). The content providing apparatus 300 transmits the content list as a search result to the control target device 200 (step S204). The control target device 200 transmits the content list acquired from the content providing apparatus 300 as a search result to the remote commander 100A (step S205).

When acquiring the content list as a search result from the control target device 200, the remote commander 100A displays a content list-screen including the acquired content list (step S206). As will be described with reference to FIG. 9, the remote commander 100A may directly acquire the content list to be displayed from the content providing apparatus 300, not via the control target device 200.

The user U performs remote control operation while viewing the displayed content list-screen, and designates content identification information (content ID) (step S207). Here, the remote commander 100A transmits a content reproduction request including the content identification information designated by the user U to the control target device 200 (step S208). When receiving the content reproduction request, the control target device 200 transmits a content transmission request including the content identification information included in the received content reproduction request to the content providing apparatus 300 (step S209). The content providing apparatus 300 transmits content identified by the content identification information included in the received content transmission request to the control target device 200 (step S210). The control target device 200 starts reproducing the content received from the content providing apparatus 300 (step S211).

Here, the control target device 200 starts reproducing the received content, the control target device 200 may also transmit the received content to the remote commander 100A. In that case, the remote commander 100A itself may reproduce the content received from the control target device 200.

1-9. Flow of Processing after Acquisition of Available Service List (Part 2)

Figure 9:
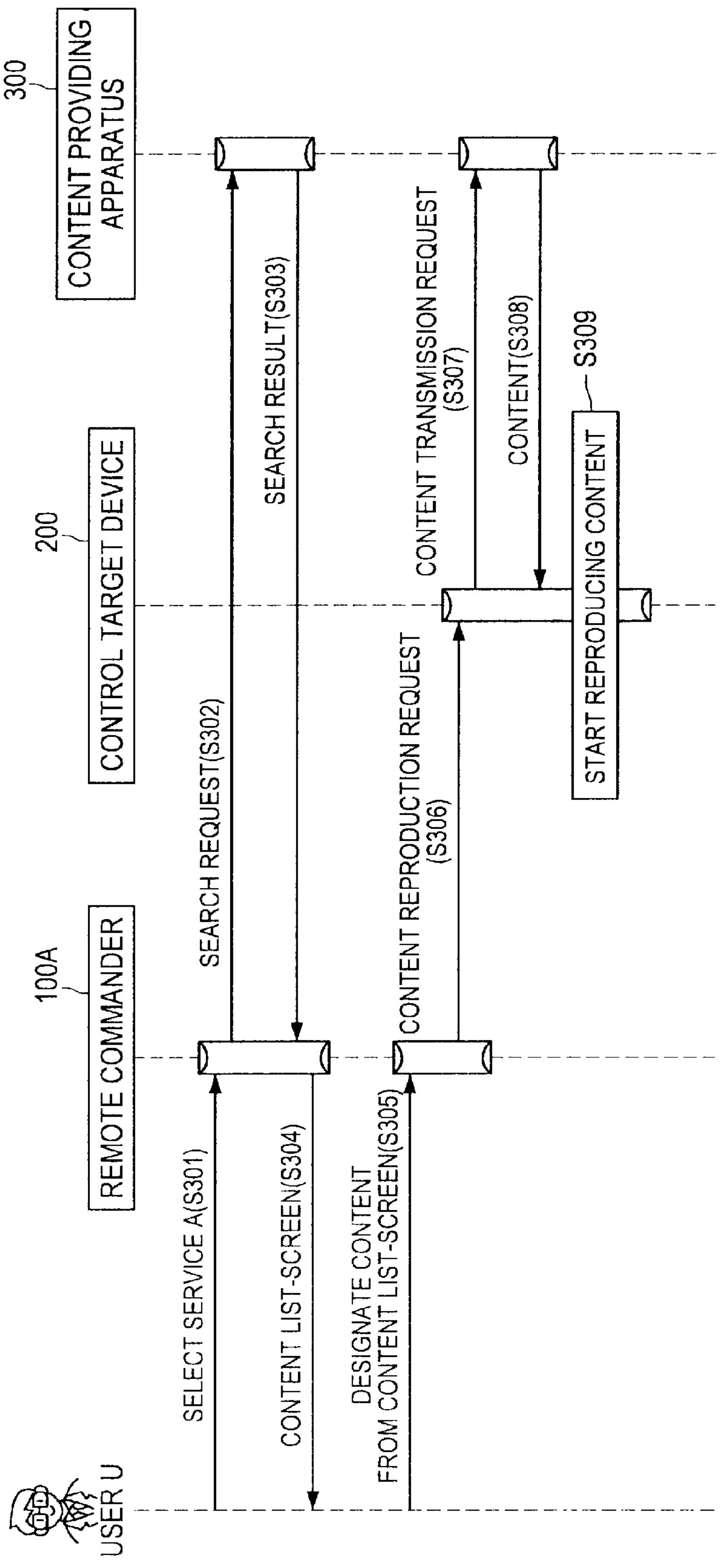
FIG. 9 is a flowchart showing a flow (in the case where the remote commander directly acquires a content list from the content providing apparatus) of processing (after selection of a service) executed by the information processing system according to the embodiment.

FIG. 9 is a flowchart showing a flow (in the case where the remote commander directly acquires a content list from the content providing apparatus) of processing (after selection of a service) executed by the information processing system according to the first embodiment of the present invention. With reference to FIG. 9, the flow (in the case where the remote commander directly acquires a content list from the content providing apparatus) of processing (after selection of a service) executed by the information processing system according to the embodiment will be described.

As shown in FIG. 9, the remote commander 100A may directly acquire the content list to be displayed from the content providing apparatus 300, not via the control target device 200. That is, the remote commander 100A transmits, to the content providing apparatus 300, a search request for acquiring a list of content to be used by the service identified by the service identification information designated by the user U (step S302). When receiving the search request, the content providing apparatus 300 transmits the content list as a search result to the remote commander 100A (step S303).

Steps S301 and S304 to S309 correspond to steps S201 and S206 to S211 shown in FIG. 8, respectively.

2. Second Embodiment

Next, a second embodiment of the present invention will be described. In the second embodiment of the present invention, an information processing apparatus acquires model information for identifying an available service list from a control target device, and acquires the available service list from a server based on the acquired model information.

2-1. Configuration of Information Processing System

Figure 10:
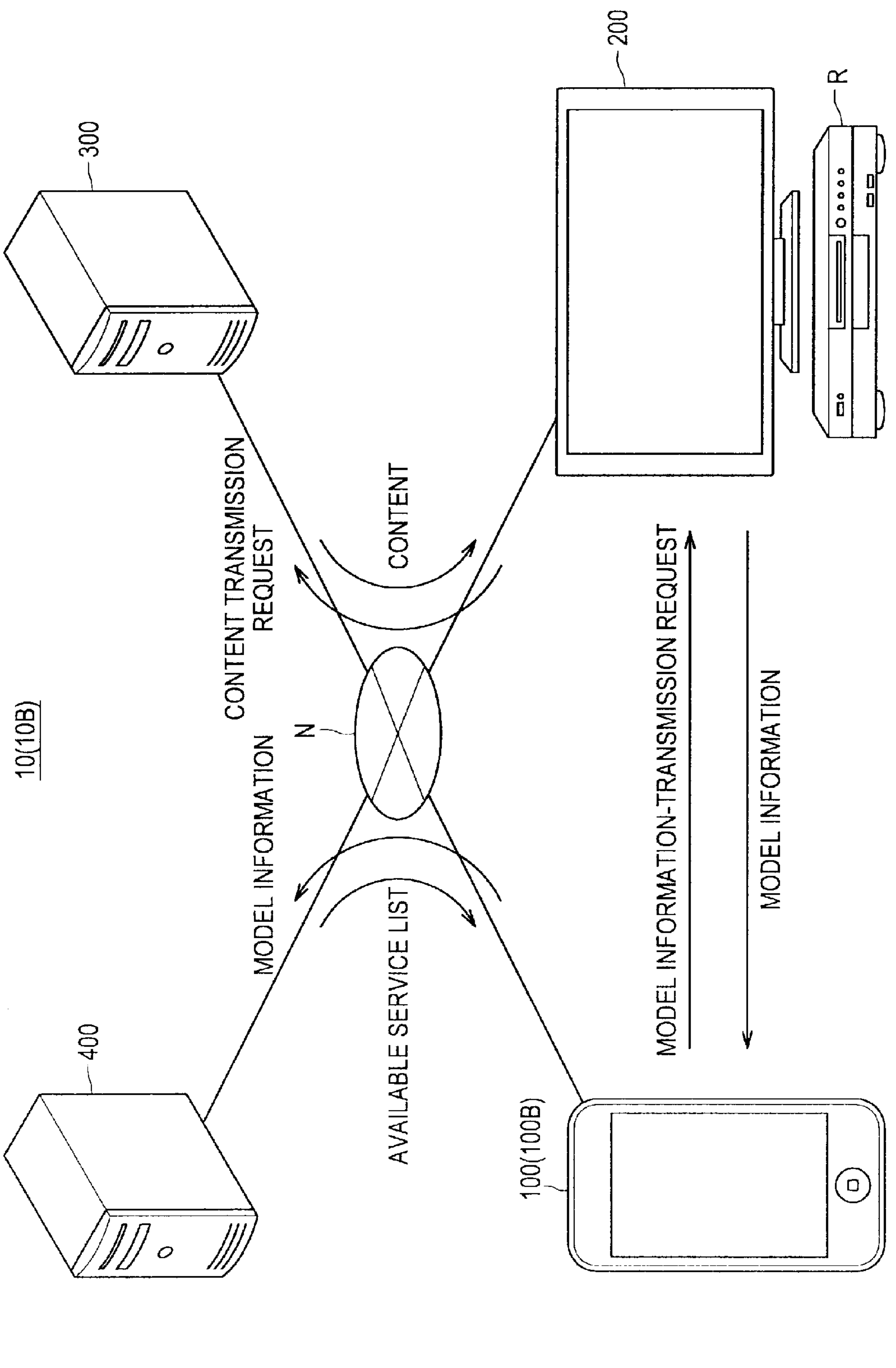
FIG. 10 is a diagram showing a configuration of an information processing system according to a second embodiment of the present invention.

FIG. 10 is a diagram showing a configuration of an information processing system according to the second embodiment of the present invention. With reference to FIG. 10, the configuration of the information processing system according to the embodiment will be described.

As shown in FIG. 10, an information processing system 10B according to the second embodiment of the present invention differs from the information processing system 10A according to the first embodiment in that the information processing system 10B includes a server 400. The server 400 is capable of communicating with a remote commander 100B, and the server 400 and the remote commander 100B are capable of communicating with each other via a network N, for example.

In the second embodiment of the present invention, the remote commander 100B transmits a model information-transmission request to a control target device 200, and receives model information as a response to the model information-transmission request. As described above, the model information is information for identifying an available service list. Subsequently, the remote commander 100B transmits the model information acquired from the control target device 200 to the server 400, and receives, as a response thereto from the server 400, the available service list identified by the model information.

Therefore, also in the second embodiment of the present invention, the remote commander 100 can acquire the available service list in the same manner as in the first embodiment of the present invention. However, the control target device 200 according to the second embodiment of the present invention holds the model information for identifying the available service list, and may transmit the model information to the remote commander 100B. Accordingly, the function similar to that of the information processing system 10A can be easily realized even in the case where it is difficult to add, to an existing control target device 200, a function of transmitting the available service list to the remote commander 100B.

2-2. Functional Configuration of Remote Commander

Figure 11:
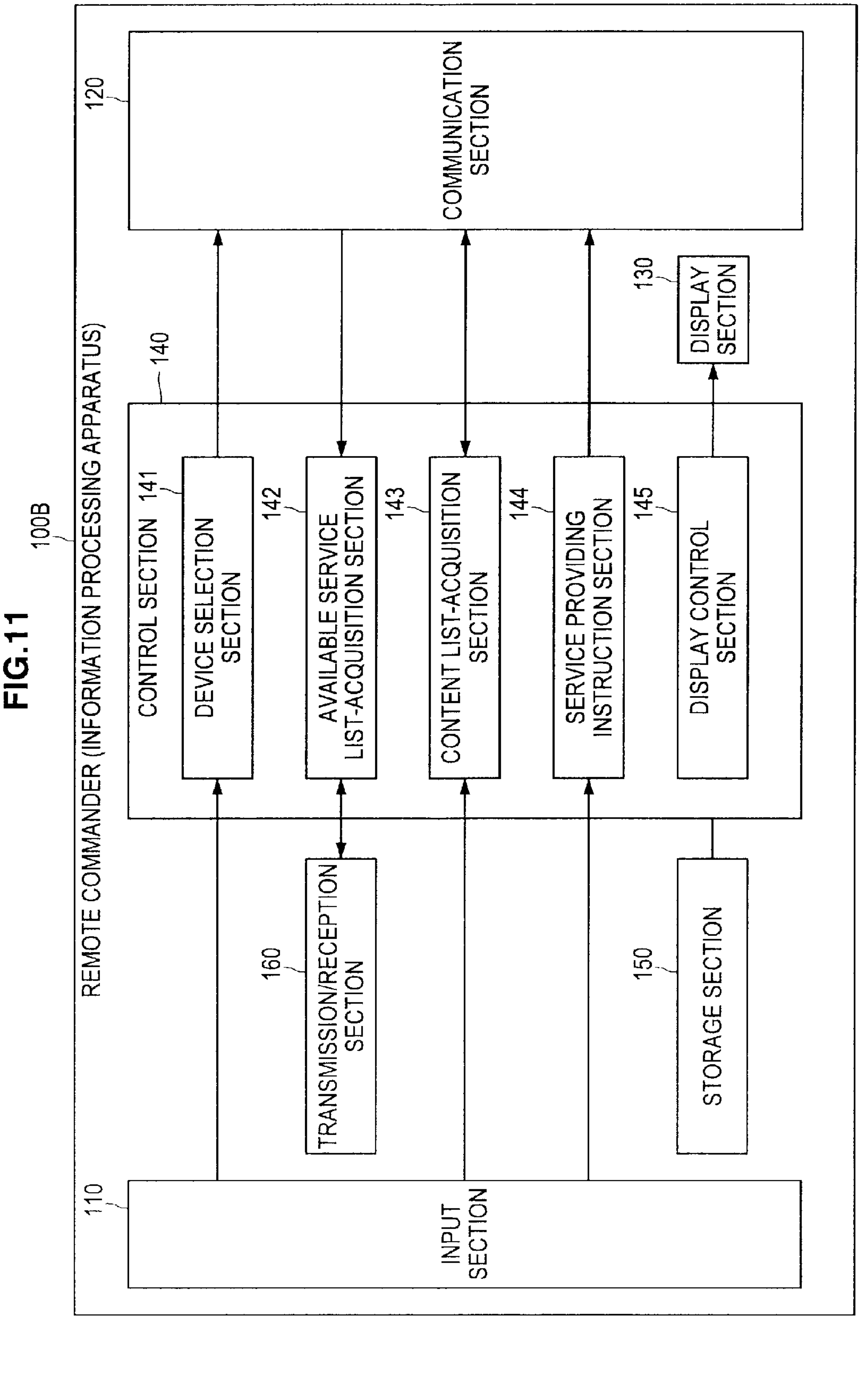
FIG. 11 is a functional configuration of a remote commander according to the embodiment.

FIG. 11 is a diagram showing a functional configuration of a remote commander according to the second embodiment of the present invention. With reference to FIG. 11, the functional configuration of the remote commander according to the embodiment will be described.

As shown in FIG. 11, the remote commander 100B according to the second embodiment of the present invention further includes a transmission/reception section 160 which communicates with the server 400. The transmission/reception section 160 is capable of transmitting/receiving a signal to/from the server 400 by wire or radio. Further, as described above, the transmission/reception section 160 may communicate with the server 400 via the network N.

The available service list-acquisition section 142 has a function of acquiring model information for identifying an available service list. Further, the available service list-acquisition section 142 has functions of transmitting the acquired model information to the server 400 via the transmission/ reception section 160 and acquiring the available service list identified by the model information from the server 400 via the transmission/reception section 160.

There are considered various techniques of acquiring the model information, and the techniques are not particularly limited. For example, the available service list-acquisition section 142 can acquire the model information from the control target device 200 via the communication section 120. In this case, the storage section 250 of the control target device 200 stores the model information, and the available service list-notification section 241 notifies the remote commander 100B of the model information stored in the storage section 250 via the communication section 220. Further, the available service list-acquisition section 142 may also acquire the model information from operation information, the input of which is accepted by the input section 110.

2-3. Functional Configuration of Server

Figure 12:
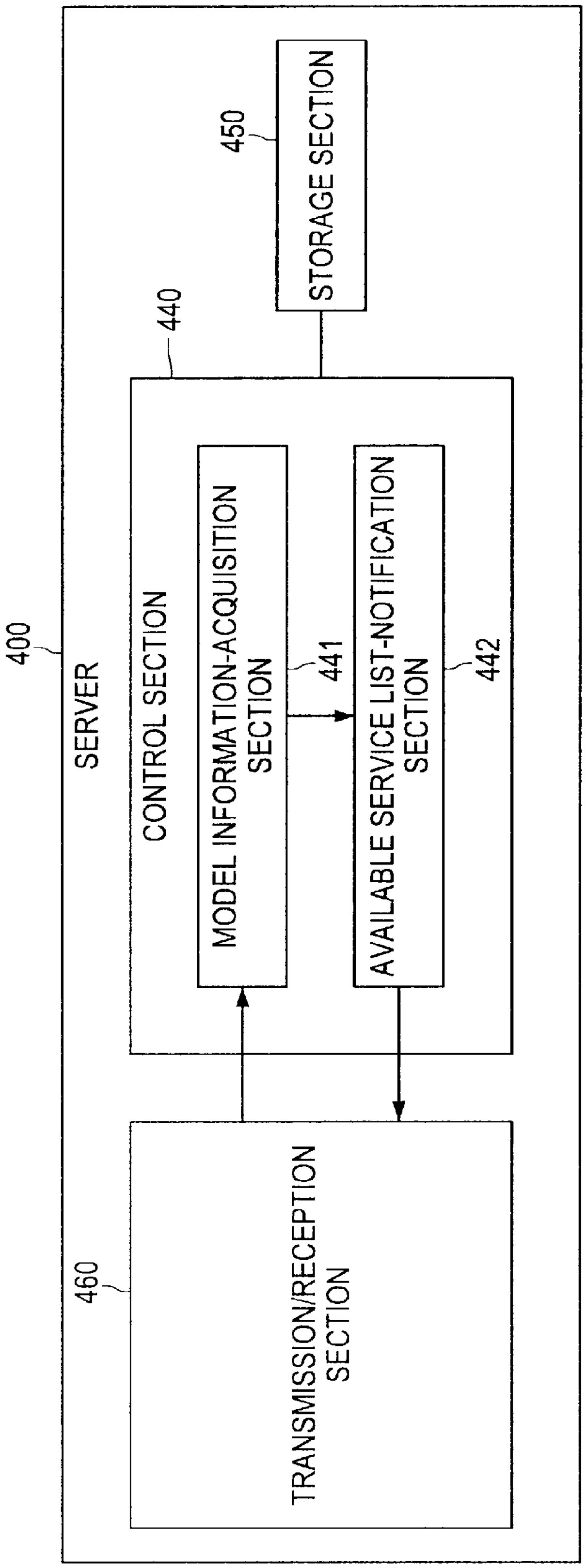
FIG. 12 is a diagram showing a functional configuration of a server according to the embodiment.

FIG. 12 is a diagram showing a functional configuration of a server according to the second embodiment of the present invention. With reference to FIG. 12, the functional configuration of the server according to the embodiment will be described.

As shown in FIG. 12, the server 400 includes a control section 440, a storage section 450, and a transmission/reception section 460.

The transmission/reception section 460 is capable of transmitting/receiving a signal to/from the remote commander 100B by wire or radio. Further, as described above, the transmission/reception section 460 may communicate with the remote commander 100B via the network N.

The control section 440 has a function of controlling operation of the remote commander 100B. The control section 440 includes, for example, a CPU and a RAM. The function of the control section 440 is realized by developing a program stored in the storage section 450 in the RAM by the CPU, and executing the program developed in the RAM by the CPU. The control section 440 includes a model information-acquisition section 441 and an available service list-notification section 442.

The model information-acquisition section 441 has a function of acquiring the model information from the remote commander 100B via the transmission/reception section 460. The model information-acquisition section 441 functions as an example of an acquisition section.

The available service list-notification section 442 has a function of notifying, via the transmission/reception section 460, the remote commander 100B of the available service list which is identified by the model information acquired by the model information-acquisition section 441. The available service list-notification section 442 functions as an example of a communication section.

The storage section 450 has a function of storing data and programs used by the control section 440. The storage section 450 includes an HDD and a semiconductor memory, for example. In addition thereto, the storage section 450 has a function of storing an available service list.

2-4. Processing Executed by Information Processing System

Figure 13:
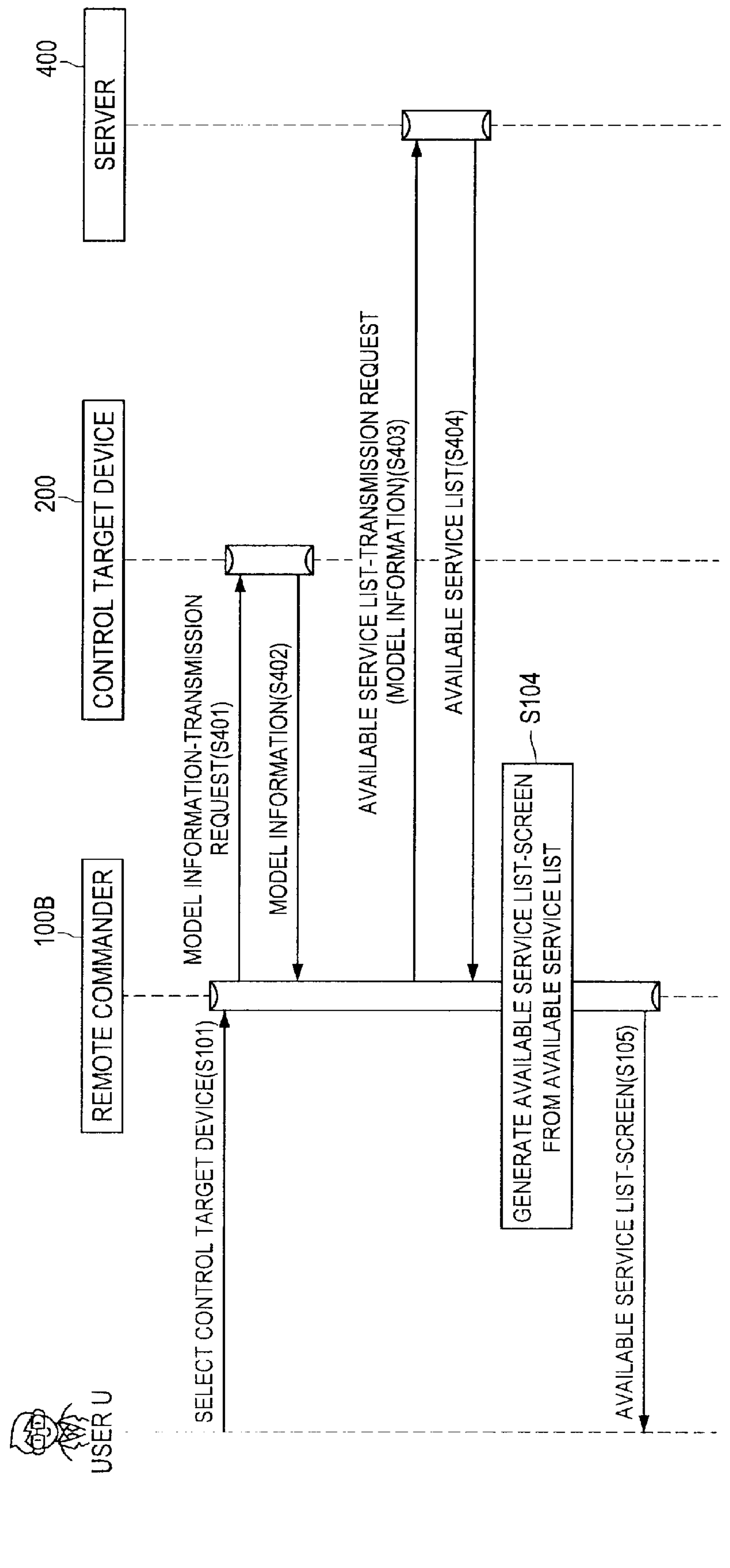
FIG. 13 is a flowchart showing a flow of processing (up to acquisition of an available service list) executed by the information processing system according to the embodiment.

FIG. 13 is a flowchart showing a flow of processing (up to acquisition of an available service list) executed by the information processing system according to the second embodiment of the present invention. With reference to FIG. 13, the processing (up to acquisition of an available service list) executed by the information processing system according to the embodiment will be described.

As shown in FIG. 13, the user U selects a control target device 200 (step S101), and the remote commander 100B transmits a model information-transmission request to the selected control target device 200 (step S401). The control target device 200 transmits, as a response to the model information-transmission request, model information to the remote commander 100B (step S402).

Subsequently, the remote commander 100B transmits an available service list-transmission request including the received model information to the server 400 (step S403). The server 400 transmits, as a response to the available service list-transmission request, an available service list to the remote commander 100B (step S404).

Steps S104 and S105 that follow are executed in the same manner as steps S104 and S105 executed by the information processing system 10A according to the first embodiment of the present invention, respectively.

3. Modified Example

It should be understood by those skilled in the art that various modifications, combinations, sub-combinations and alterations may occur depending on design requirements and other factors insofar as they are within the scope of the appended claims or the equivalents thereof.

For example, it is not necessary that the information processing system according to the embodiments of the present invention execute the processing in the order shown in the flowcharts, and the order of the processing may be appropriately changed. Further, the information processing system according to the embodiments of the present invention may execute the processing shown in the flowcharts once, or may execute the processing multiple times repeatedly.

4. Summary

According to the present embodiments, it becomes possible for the remote commander 100 as an example of the information processing apparatus to grasp, per each control target device 200, a service which a control target device is capable of providing the remote commander 100 with. Thus, the remote commander 100 can generate and display different available service list-screens depending on respective control target devices 200. The user can grasp which service the control target device 200 is available in by viewing the available service list.

Further, since the remote commander 100 can grasp a service which the control target device 200 is capable of providing, the remote commander 100 can easily retrieve a list of content to be used by the service and can generate and display a content list-screen. By viewing the content list-screen, the user can easily receive a service which uses desired content.

Further, according to the second embodiment of the present invention, the control target device 200 holds model information for identifying an available service list, and may transmit the available service list to the remote commander 100B. Accordingly, the function similar to that of the information processing system 10A can be easily realized even in the case where it is difficult to add, to an existing control target device 200, a function of transmitting the available service list to the remote commander 100B.

What is claimed is:

1. A control target device comprising:

a communication section which communicates with an information processing apparatus via a radio signal;

a notification section which notifies, via the communication section, the information processing apparatus of service identification information for identifying each of one or more plurality of services, provided by the control target device to the information processing apparatus, wherein the information processing apparatus creates an available service list comprising each of the identified one or more plurality of services for display on a first display device; and a processing execution section which acquires, from the information processing apparatus via the communication section, a selected service, selected from the available service list which is displayed on the first display device, and which executes processing providing the selected service; and a display control section which causes content to be displayed on a second display device, different from the first display device, in accordance with the execution of processing of providing the selected service.

2. The control target device of claim 1, wherein the processing execution section provides content identification information, from a content providing apparatus, associated with the selected service, wherein the information processing apparatus is configured to create a content list, comprising the content identification information, for display on the first display device.

3. The control target device of claim 1, wherein the processing execution section receives, from the information processing apparatus via the communication section, selected content identification information, associated with the selected service and selected from a content list displayed on the first display device.

4. The control target device of claim 1, wherein the processing execution section controls transmission, to the information processing apparatus via the communication section, of model information for identifying the each of the one or more plurality of services.

5. An information processing method comprising:

controlling, by a processor, communication with an information processing apparatus via a radio signal, wherein the communication notifies the information processing apparatus of service identification information for identifying each of one or more plurality of services, provided to the information processing apparatus, and wherein the information processing apparatus creates an available service list comprising each of the identified one or more plurality of services for display on a first display device;

acquiring, by the processor, from the information processing apparatus via the communication, a selected service, selected from the available service list which is displayed on the first display device; and controlling, by the processor, processing of providing the selected service and display of content on a second display device, different from the first display device, in accordance with the processing of providing the selected service.

6. A non-transitory computer-readable storage medium having stored thereon, a set of computer executable instructions, for causing a computer to perform steps comprising:

controlling communication with an information processing apparatus via a radio signal, wherein the communication notifies the information processing apparatus of service identification information for identifying each of one or more plurality of services, provided to the information processing apparatus, and wherein the information processing apparatus creates an available service list comprising each of the identified one or more plurality of services for display on a first display device;

acquiring, from the information processing apparatus via the communication, a selected service, selected from the available service list which is displayed on the first display device;

controlling processing of providing the selected service, and display of content on a second display device, different from the first display device, in accordance with the processing of providing the selected service.

* * * * *